United States Patent
Yoo

(10) Patent No.: US 7,253,938 B2
(45) Date of Patent: Aug. 7, 2007

(54) LASER SCANNING APPARATUS

(75) Inventor: Jae-hwan Yoo, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 63 days.

(21) Appl. No.: 10/868,972

(22) Filed: Jun. 17, 2004

(65) Prior Publication Data

US 2005/0036189 A1 Feb. 17, 2005

(30) Foreign Application Priority Data

Aug. 11, 2003 (KR) ............... 10-2003-0055361

(51) Int. Cl.
*G02B 26/08* (2006.01)

(52) U.S. Cl. ............... 359/206; 359/216

(58) Field of Classification Search ............ None
See application file for complete search history.

(56) References Cited

U.S. PATENT DOCUMENTS

| | | | |
|---|---|---|---|
| 4,101,193 A | | 7/1978 | Waterworth et al. |
| 5,134,513 A | * | 7/1992 | Morimoto ............ 359/212 |
| 5,278,691 A | * | 1/1994 | Kessler ............ 359/216 |
| 6,222,663 B1 | * | 4/2001 | Plotkin et al. ............ 359/216 |

FOREIGN PATENT DOCUMENTS

| | | |
|---|---|---|
| JP | 06-078115 | 3/1994 |
| JP | 06-095020 | 4/1994 |
| JP | 09-197314 | 7/1997 |
| JP | 2001-066527 | 3/2001 |
| JP | 2001-183595 | 7/2001 |
| JP | 2002-228959 | 8/2002 |

* cited by examiner

*Primary Examiner*—James Phan
(74) *Attorney, Agent, or Firm*—Roylance, Abrams, Berdo & Goodman, L.L.P.

(57) ABSTRACT

A light scanning apparatus is provided. The light scanning apparatus includes a beam splitter, which is located between a polygonal mirror and an fθ lens and reflects a portion of light incident thereon to the polygonal mirror. A laser beam reflected from the beam splitter is reflected by the polygonal mirror and incident on the fθ lens. The path of a laser beam incident on the polygonal mirror and the path of the laser beam reflected from the polygonal mirror are at the same level with each other. Therefore, by installing a beam splitter in a laser scanning apparatus, it is possible to reduce the length of each reflective surface of the polygonal mirror in a main scanning direction without increasing the length of each reflective surface of the polygonal mirror in a sub scanning direction. In addition, it is possible to perform high-speed scanning while making less noise.

3 Claims, 4 Drawing Sheets ically, of the light scanning apparatus disclosed in Japanese Patent Publication No. 2001-183595. In FIGS. 1 through 3,
LASER SCANNING APPARATUS

PRIORITY

This application claims the benefit under 35 U.S.C. §119 (a) of Korean Patent Application No. 2003-55361, filed on Aug. 11, 2003, in the Korean Intellectual Property Office, the entire disclosure of which is incorporated herein by reference.

BACKGROUND OF THE INVENTION

1. Field of the Invention

The present invention relates to a laser scanning apparatus. More particularly, the present invention relates to a laser scanning apparatus employing a beam splitter, which is disposed between a polygonal mirror and an fθ lens.

2. Description of the Related Art

Laser scanning apparatuses, which are widely employed in printing devices, such as laser printers, form latent electrostatic images corresponding to images to be printed on the surface of a photosensitive medium by scanning laser beams on the photosensitive medium.

In general, a laser scanning apparatus has an optical system as shown in FIG. 1. Referring to FIG. 1, the optical system includes a laser diode 1, which emits a laser beam, a collimator lens 2, which has a slit 3 attached at the front thereof to collimate the laser beam emitted from the laser diode 1 so that it can be parallel to an optical axis, and a cylindrical lens 4, which focuses the collimated laser beam onto a reflective surface of a polygonal mirror 5 in a horizontally linear shape. The polygonal mirror 5, rotates horizontally at a constant speed and scans the laser beam passing through the cylindrical lens 4. A motor 6 rotates the polygonal mirror 5 at a constant speed. An fθ lens 7 has a refractive index with respect to an optical axis and polarizes a laser beam reflected from the polygonal mirror 5 in a main scanning direction and corrects aberration to focus the laser beam on a scanned surface. The optical system also includes a reflection mirror 8 which reflects a laser beam passing through the fθ lens 7 onto a surface of a photosensitive drum 9 in the form of dots. An optical sensor 11 receives laser beams reflected by a synchronous signal detecting mirror 10 and performs horizontal synchronization. When the polygonal mirror 5 rotates in a direction 'A' in FIG. 1, a laser beam is scanned in a direction 'B' in FIG. 1 so that image information can be recorded on the surface of the photosensitive drum 9.

To quickly print documents, the polygonal mirror 5 should be rotated at high speeds, or the number of reflective surfaces of the polygonal mirror 5 should be increased.

However, as the rotation speed of the polygonal mirror 5 increases, the motor 6 generates more noise. In addition, as the number of reflective surfaces of the polygonal mirror 5 increases, the size of the polygonal mirror 5 increases because each reflective surface of the polygonal mirror 5 has a uniform length in the main scanning direction.

Japanese Patent Publication No. 2001-183595, which is incorporated herein discloses a light scanning apparatus, which can reduce the size of a polygonal mirror even if the number of reflective surfaces increases, by reducing the length of each reflective surface of the polygonal mirror in a main scanning direction.

FIGS. 2 and 3 are a plan view and a side view, respectively, of the light scanning apparatus disclosed in Japanese Patent Publication No. 2001-183595. In FIGS. 1 through 3, the same reference numerals represent the same elements, and thus their descriptions will be omitted.

Referring to FIGS. 2 and 3, a laser beam emitted from a laser diode 1 and passing through a collimator lens 2, a slit 3, and a cylindrical lens 4 is reflected by a mirror 20 so that it is incident on an upper portion of the fθ lens 7. The laser beam passing through an fθ lens 7 is incident on a reflective surface of a polygonal mirror 5 and then reflected. The laser beam reflected from the polygonal mirror 5 passes through a lower portion of the fθ lens 7, is reflected by the reflection mirror 8, and is focused on a surface of a photosensitive drum 9. Therefore, as shown in FIG. 2, the laser beam emitted from the laser diode 1 is vertically incident on the polygonal mirror 5, and thus the polygonal mirror 5 can be designed so that the length of each reflective surface of the polygonal mirror 5 in a main scanning direction can be reduced. Therefore, the diameter of the polygonal mirror 5 can be reduced even if the number of reflective surfaces of the polygonal mirror 5 increases.

However, as shown in FIG. 3, the laser beam emitted from the laser diode 1 passes through the fθ lens 7 twice. Therefore, in order to obtain an image with a high quality, the shape of the fθ lens 7 in a sub scanning direction, requires a more complicated form. In other words, since the laser beam passes through the upper and lower portions of the fθ lens rather than a middle portion of the fθ lens 7, the fθ lens 7 should be precisely manufactured so that pitch errors can be prevented. In addition, in order to precisely manufacture the fθ lens 7, an effective length of the fθ lens 7 in a sub scanning direction should increase, which results in an undesirable increase in the total length of the fθ lens 7 in the sub scanning direction.

Seen from the sub scanning direction, the laser beam is slantingly incident on a reflective surface of the polygonal mirror 5 and then slantingly reflected from the polygonal mirror 5. Therefore, the length of the reflective surface of the polygonal mirror 5 in the sub scanning direction is increased.

SUMMARY OF THE INVENTION

The present invention provides a light scanning apparatus, in which a laser beam emitted from a light source is perpendicularly incident on a reflective surface of a polygonal mirror with respect to a sub scanning direction and in an opposite direction to the path of a laser beam reflected from the polygonal mirror with respect to a major scanning direction.

According to an aspect of the present invention, there is provided a light scanning apparatus. The light scanning apparatus includes a light source, a collimator lens, which collimates a laser beam emitted from the light source, a cylindrical lens, which images a laser beam passing through the collimator lens in a linear shape, a beam splitter, which reflects a portion of a laser beam passing through the cylindrical lens and transmits the remaining portions of the laser beam therethrough, a polygonal mirror, which deflects a laser beam reflected from the beam splitter, and an fθ lens, which images a laser beam deflected by the polygonal mirror onto a photosensitive material. The beam splitter may be located at the same level with and between the polygonal mirror and the fθ lens.

A path of a laser beam reflected from the beam splitter and incident on a reflective surface of the polygonal mirror may be at the same level with a path of a laser beam reflected from the polygonal mirror and passing through the beam splitter. The beam splitter may be a half-mirror.

BRIEF DESCRIPTION OF THE DRAWINGS

The above and other features and advantages of the present invention will become more apparent by describing in detail an exemplary embodiment thereof with reference to the attached drawings in which.

Throughout the drawings, it should be understood that like reference numbers are used to depict like features and structures.

DETAILED DESCRIPTION OF THE INVENTION

The present invention will now be described more fully with reference to the accompanying drawings, in which an exemplary embodiment of the invention is shown.

Figure 1:
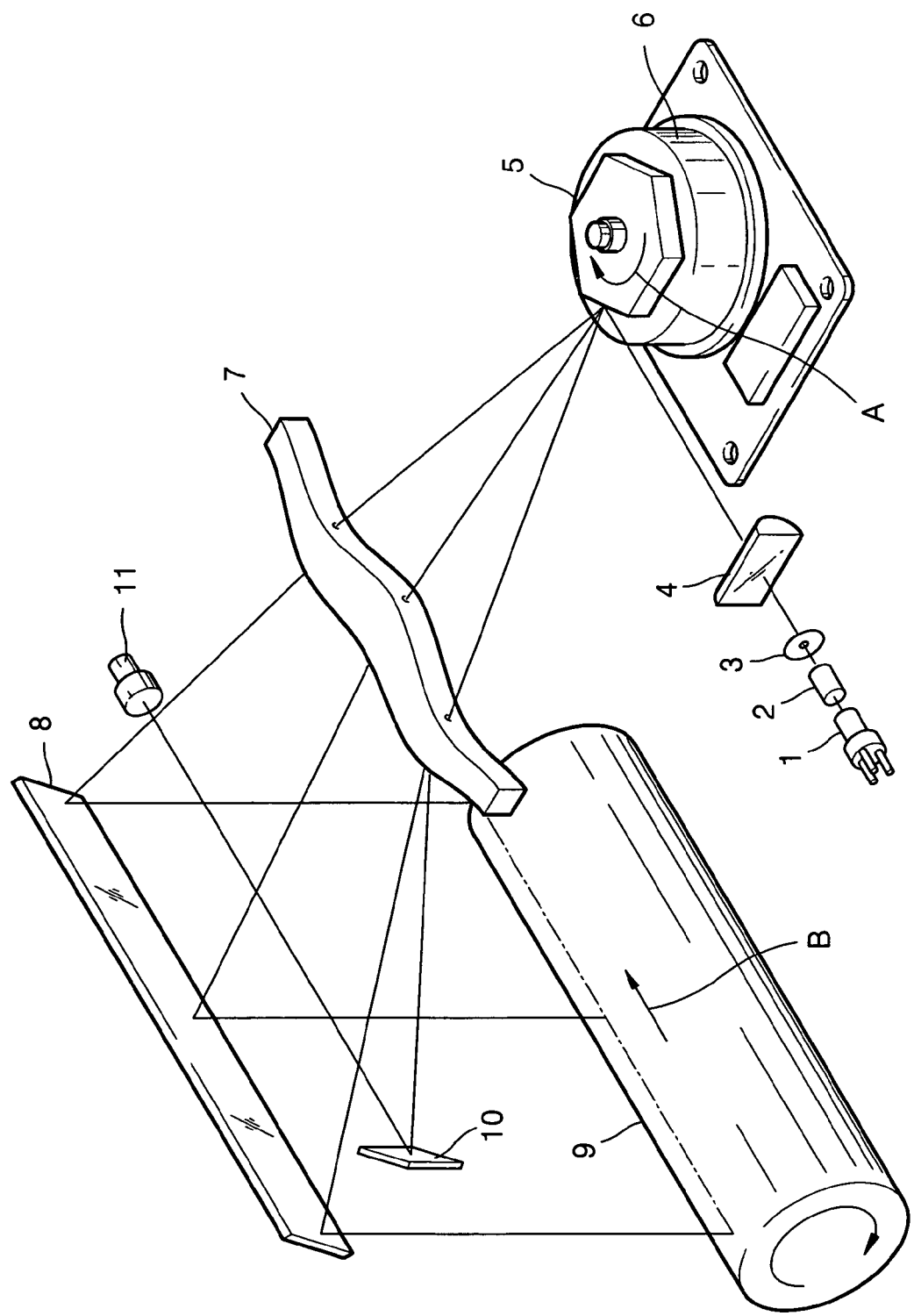
FIG. 1 is a diagram illustrating the internal configuration of a conventional light scanning apparatus.
Figure 2:
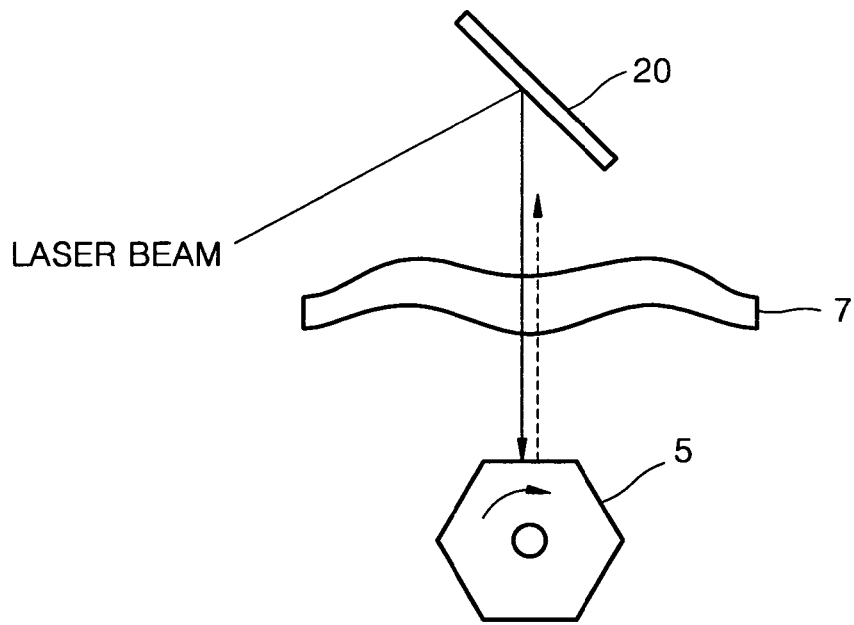
FIGS. 2 and 3 are a plan view and a side view, respectively, illustrating a light scanning apparatus disclosed in Japanese Patent Publication No. 2001-183595.
Figure 3:
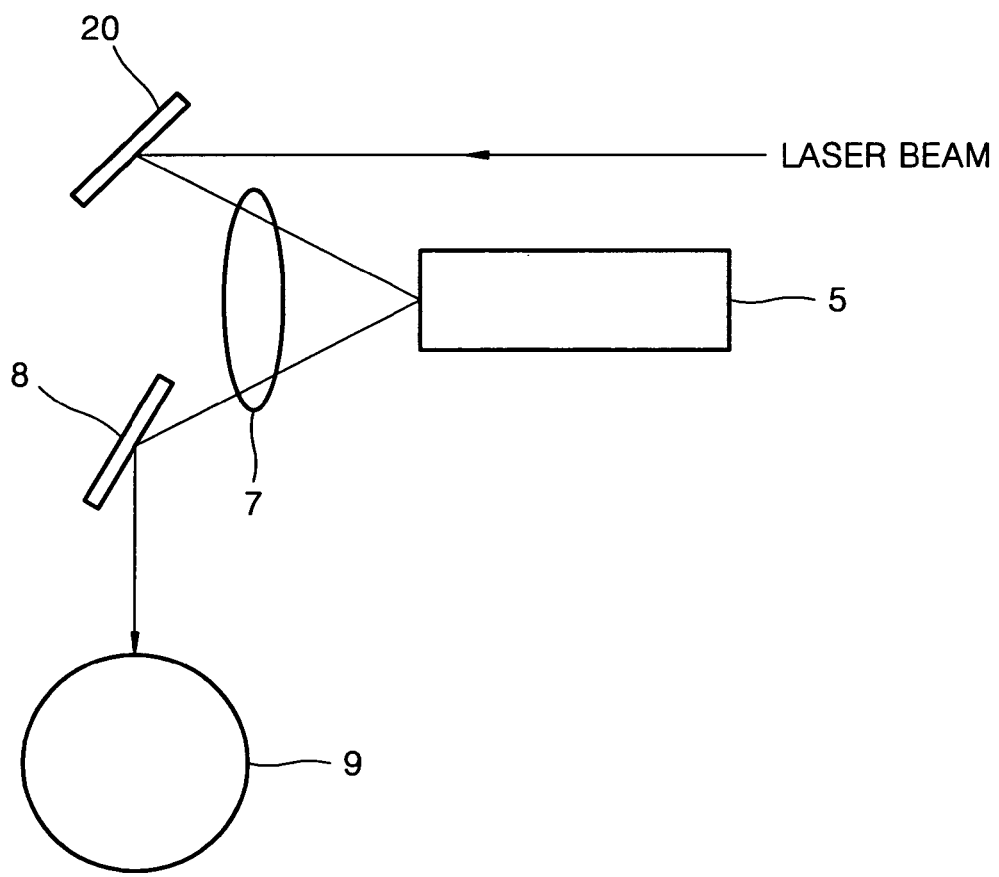
Figure 4:
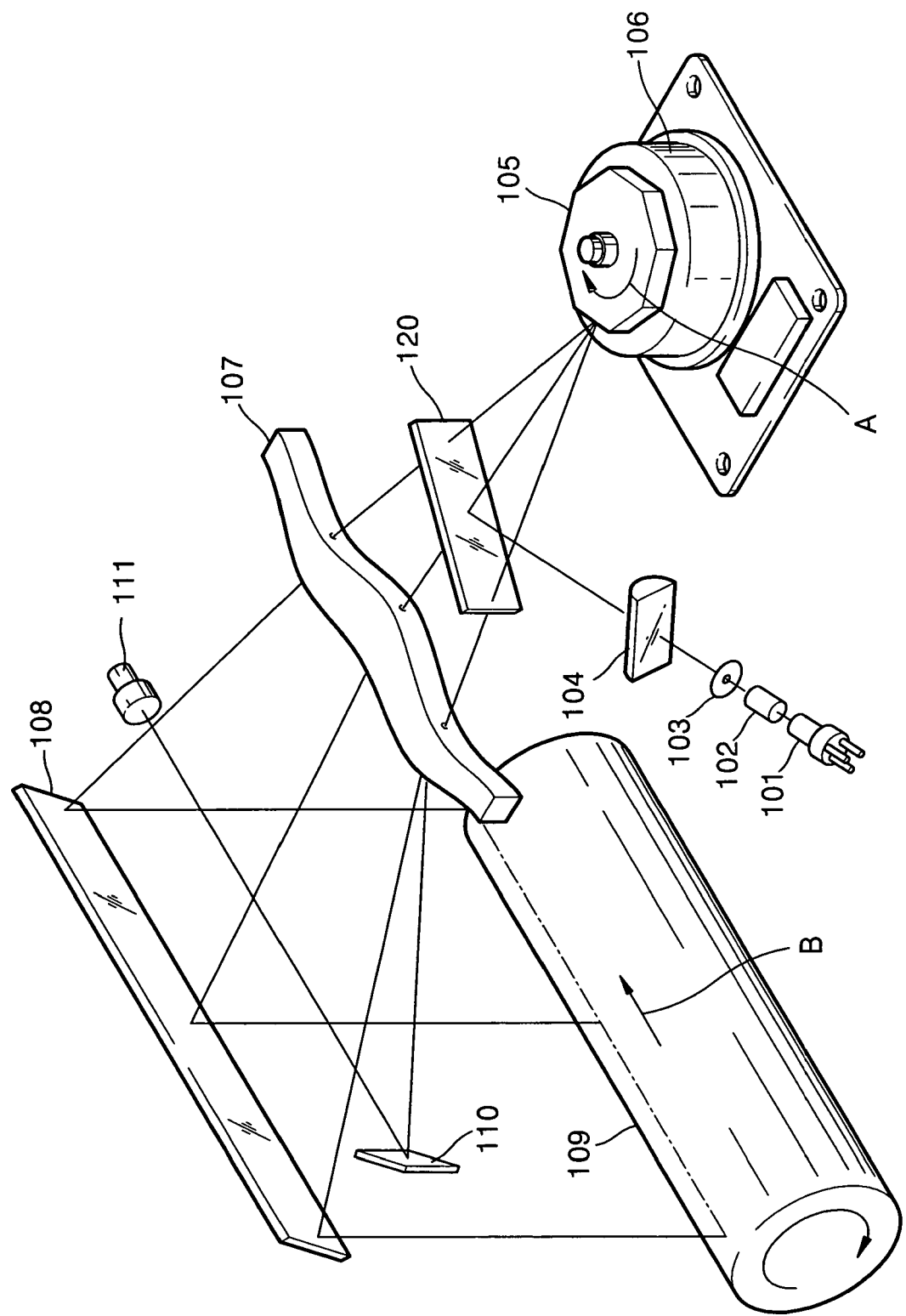
FIG. 4 is a schematic diagram of a light scanning apparatus according to a preferred embodiment of the present invention.

FIG. 4 is a schematic diagram illustrating a laser scanning apparatus according to an embodiment of the present invention. Referring to FIG. 4, the laser scanning apparatus includes a laser diode 101, which emits a laser beam, a collimator lens 102, which collimates the laser beam emitted from the laser diode 101 so that it can be parallel to an optical axis, and a slit 103, which is attached at the front of the collimator lens 102 to confine the amount of light passing therethrough. The device also includes a cylindrical lens 104, which images a laser beam on a beam splitter 120 in a horizontally linear shape. The beam splitter 120 reflects a proportion of the laser beam passing through the cylindrical lens 104 and transmits the rest of the laser beam through it. The device has a polygonal mirror 105, which performs scanning by horizontally moving the laser beam reflected from the beam splitter 120 at a constant speed, a motor 106, which rotates the polygonal mirror 105 at a constant speed, an fθ lens 107, which has a refractive index with respect to an optical axis and polarizes the laser beam deflected from the polygonal mirror 105 at a constant speed in a main scanning direction and corrects aberration to focus the laser beam on a scanned surface, a reflection mirror 108, which reflects a laser beam passing through the fθ lens 107 on a surface of a photosensitive drum 109 in the form of dots, and an optical sensor 111, which receives a laser beam reflected by a synchronous signal detecting mirror 110 and performs horizontal synchronization. When the polygonal mirror 105 rotates in a direction 'A' in FIG. 4, a laser beam is scanned in a direction 'B' in FIG. 4 so that image data can be recorded on the surface of the photosensitive drum 109.

The beam splitter 120 is preferably a half-mirror, which transmits 50% of light incident thereon through it.

The beam splitter 120 is located at the same level with and between the polygonal mirror 105 and the fθ lens 107. In other words, the path of a laser beam reflected from the beam splitter 120 and incident on a reflective surface of the polygonal mirror 105 is at the same level with the path of a laser beam deflected from the polygonal mirror 105 and passing through the beam splitter 120. In addition, the path of a laser beam incident on the polygonal mirror 105 and the path of the laser beam deflected from the polygon mirror 105 are in almost opposite directions.

Figure 5:
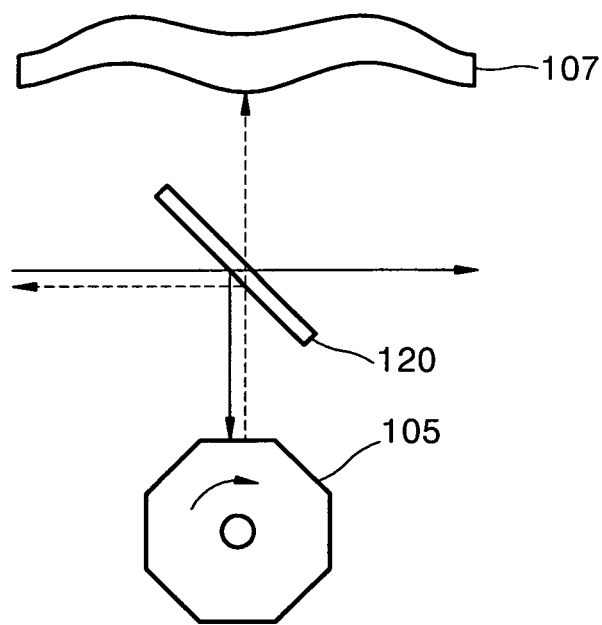
FIGS. 5 and 6 are a plan view and a side view, respectively, illustrating the operation of the laser scanning apparatus of FIG. 4.
Figure 6:
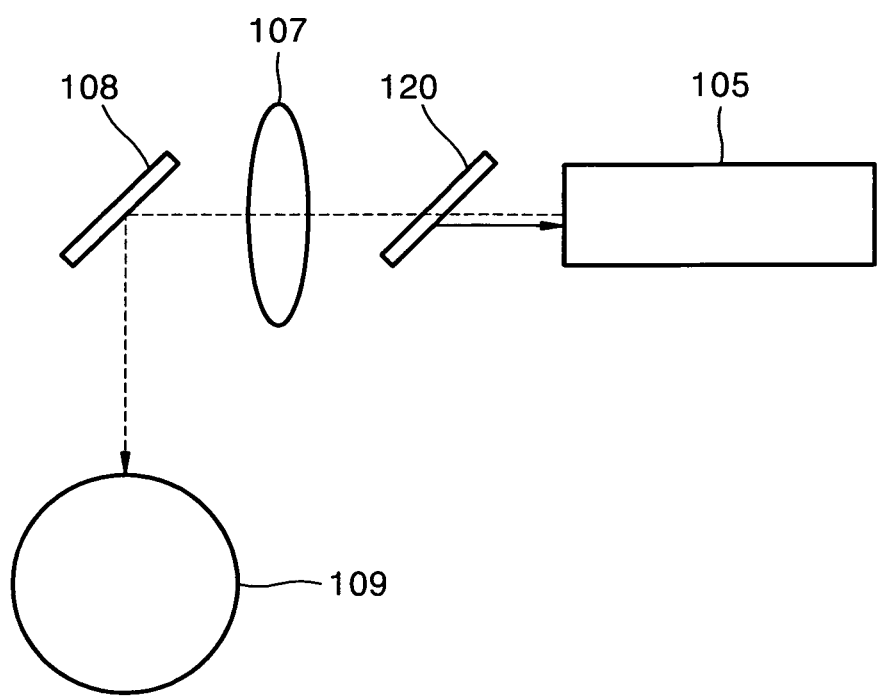

FIGS. 5 and 6 are a plan view and a side view, respectively, illustrating the operation of the light scanning apparatus of FIG. 4. Referring to FIG. 5, the beam splitter 120 is disposed between the fθ lens 107 and the polygonal mirror 105. A laser beam emitted from the laser diode 101 passes through the collimator lens 102, the slit 103, and the cylindrical lens 104 and is reflected by the beam splitter 120. The laser beam reflected from the beam splitter 120 is incident on a reflective surface of the polygonal mirror 105 and then deflected by the reflective surface of the polygonal mirror 105. The laser beam deflected from the polygonal mirror 105 passes through a middle portion of the fθ lens 107 and is reflected by the reflection mirror 108 so that it can be imaged onto a surface of the photosensitive drum 109. As shown in FIG. 5, in a main scanning direction, the laser beam is incident on the polygonal mirror 105 in an almost opposite direction to a direction in which it is deflected from the polygonal mirror 105, and thus the polygonal mirror 105 may be designed so that the length of each reflective surface thereof in the main scanning direction can be reduced. Therefore, even if the number of reflective surfaces of the polygonal mirror 105 increases, the diameter of the polygonal mirror 105 can be reduced.

Referring to FIG. 6, a laser beam emitted from the laser diode 101 and reflected by the beam splitter 120 is perpendicularly incident on a reflective surface of the polygonal mirror 105. Some of the laser beam deflected from the polygonal mirror 105 passes through the beam splitter 120 and the middle portion of the fθ lens 107. The laser beam passing through the fθ lens 107 is reflected by the reflection mirror 108 and then imaged on the surface of the photosensitive drum 109. The path of the laser beam traveling from the polygonal mirror 105 to the reflection mirror 108 is at the same level with the path of the laser beam incident on the polygonal mirror 105.

In the present invention, it is possible to design the polygonal mirror 105 to have a shorter diameter than in the prior art. Therefore, even if the number of reflective surfaces of the polygonal mirror 105 increases, the diameter of the polygonal mirror 105 can be reduced. Thus, it is possible to increase a scanning speed without increasing the rotation speed of the polygonal mirror 105. In addition, since the path of the laser beam traveling from the polygonal mirror 105 to the reflection mirror 108 is at the same level with the path of the laser beam incident on the polygonal mirror 105, there is no need to increase the length of the polygonal mirror in a sub scanning direction or to increase the effective length of the fθ lens 107 in the sub scanning direction.

As described above, according to an embodiment of the present invention, the path of a laser beam incident on a polygon mirror and the path of a laser beam reflected from the polygonal mirror are in almost opposite directions. Accordingly, it is possible to reduce the length of each reflective surface of the polygonal mirror in a main scanning direction without increasing the length of each reflective surface of the polygonal mirror in a sub scanning direction, by installing a beam splitter in a laser scanning apparatus. In addition, it is possible to perform high-speed scanning with less noise.

While the present invention has been particularly shown and described with reference to exemplary embodiments thereof, it will be understood by those of ordinary skill in the art that various changes in form and details may be made therein without departing from the spirit and scope of the present invention as defined by the following claims and equivalents thereof.

What is claimed is:

1. A light scanning apparatus, comprising:
    a light source;
    a collimator lens, which collimates a laser beam emitted from the light source;
    a cylindrical lens, which images the laser beam passing through the collimator lens in a linear shape;
    a beam splitter comprising a half-mirror, which reflects a portion of the laser beam passing through the cylindrical lens and transmits a remaining portion of the laser beam therethrough;
    a polygonal mirror, which deflects the portion of the laser beam reflected from the beam splitter; and
    an f$\theta$ lens, which images the portion of the laser beam deflected by the polygonal mirror on a photosensitive material.

2. The light scanning apparatus of claim 1, wherein the beam splitter is located at the same level with and between the polygonal mirror and the f$\theta$ lens.

3. The light scanning apparatus of claim 1, wherein a path of the portion of the laser beam reflected from the beam splitter and incident on a reflective surface of the polygonal mirror is at the same level with a path of the portion of the laser beam deflected by the polygonal mirror and passing through the beam splitter.

* * * * *